(12) United States Patent
He et al.

(10) Patent No.: US 9,106,655 B2
(45) Date of Patent: Aug. 11, 2015

(54) REAL-TIME TRANSPORT PROTOCOL (RTP) SOURCE TRANSLATOR

(71) Applicants: Bing He, Shanghai (CN); Juergen Stoetzer-Bradler, Marbach am Neckar (DE); Chao Sun, Shanghai (CN); Carsten Waitzmann, Kornwestheim (DE); Quanxiu Liu, Shanghai (CN)

(72) Inventors: Bing He, Shanghai (CN); Juergen Stoetzer-Bradler, Marbach am Neckar (DE); Chao Sun, Shanghai (CN); Carsten Waitzmann, Kornwestheim (DE); Quanxiu Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/049,316

(22) Filed: Oct. 9, 2013

(65) Prior Publication Data
US 2015/0100634 A1    Apr. 9, 2015

(51) Int. Cl.
*G06Q 10/10* (2012.01)
*H04L 29/08* (2006.01)
*H04L 29/06* (2006.01)

(52) U.S. Cl.
CPC ................ *H04L 67/10* (2013.01); *H04L 65/40* (2013.01)

(58) Field of Classification Search
CPC .. G06Q 10/10; H04L 29/06; H04L 29/08072; H04L 29/06027; H04L 12/581
See application file for complete search history.

(56) References Cited

U.S. PATENT DOCUMENTS

| 2005/0207361 A1* | 9/2005 | Rosenberg et al. ........... 370/282 |
| 2008/0205390 A1* | 8/2008 | Bangalore et al. ............ 370/389 |

\* cited by examiner

*Primary Examiner* — David X Yi
*Assistant Examiner* — Hien Doan
(74) *Attorney, Agent, or Firm* — Harness, Dickey & Pierce, P.L.C.

(57) ABSTRACT

A translation device includes a receiver, a processor and a transmitter. The receiver is configured to receive packets from a first party designated for a second party, the received packets including parameters associated with the first party. The processor is configured to translate the parameters of the received packets to form translated packets such that the parameters of the translated packets are associated with the device. The transmitter is configured to transmit the translated packets to the second party.

14 Claims, 9 Drawing Sheets

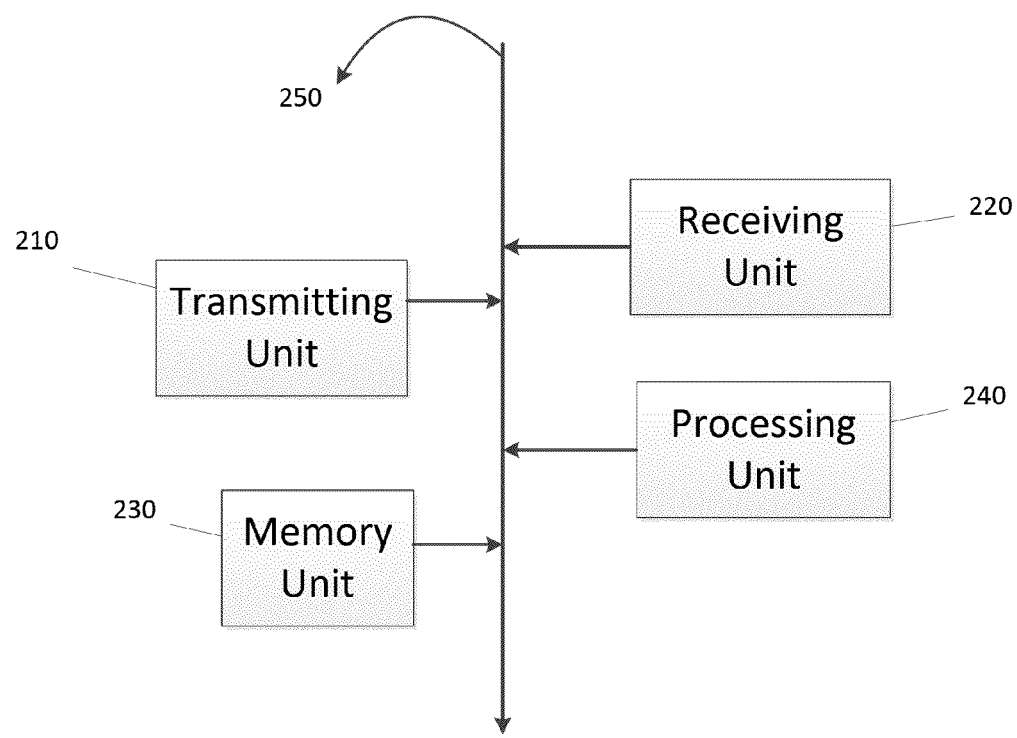

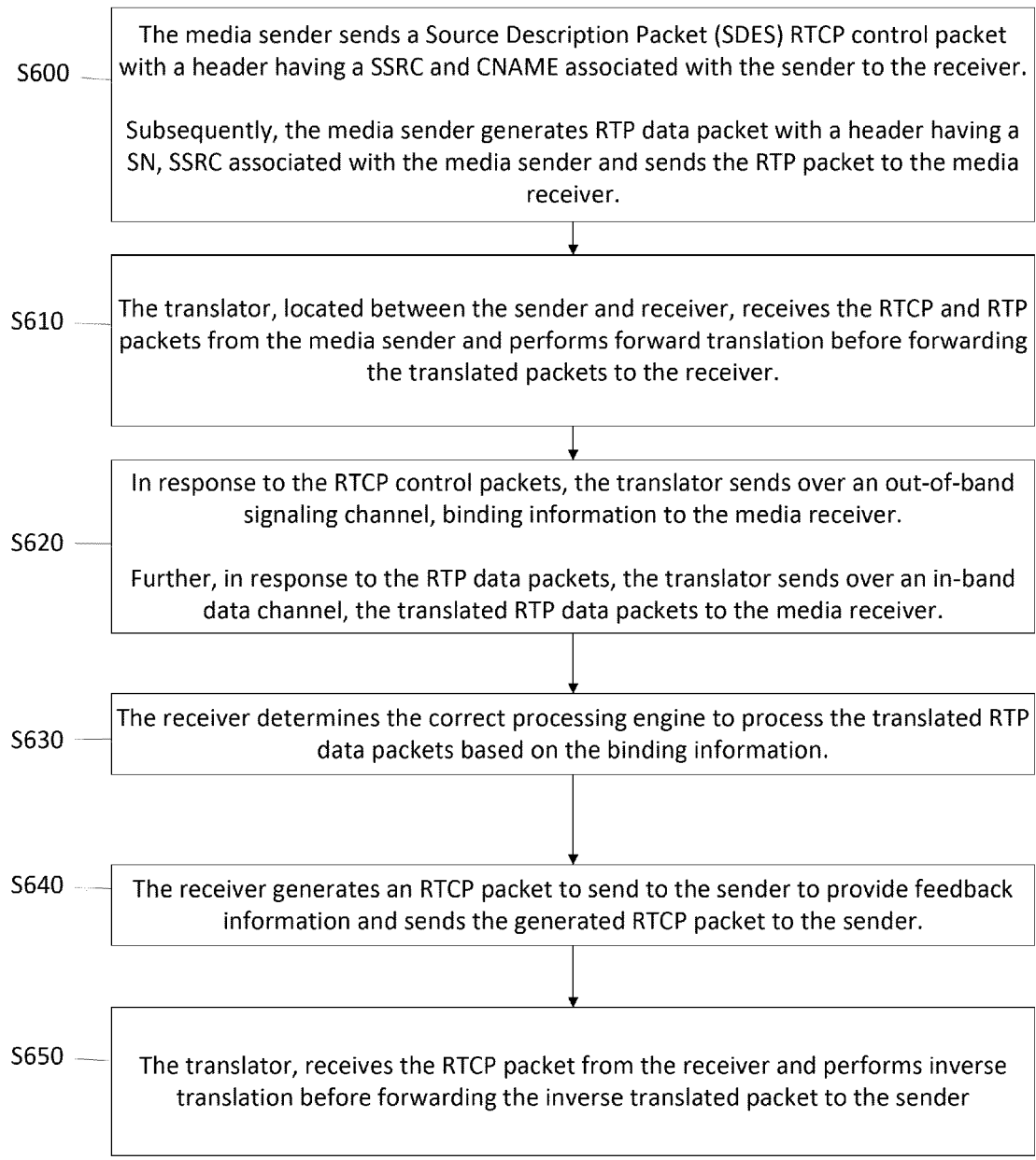

REAL-TIME TRANSPORT PROTOCOL (RTP) SOURCE TRANSLATOR

FIELD

The invention is related to the field of communication systems and in particular to a translation device, a method and/or a system configured to translate media packets transmitted between parties.

BACKGROUND

Web Real-Time Communication (WebRTC) is a protocol enabling direct interactive rich browser-to-browser communication (e.g., voice calling, video chat and P2P file sharing) using Real-time Transport Protocol (RTP) sessions between user equipments (UEs) without requiring the UEs to have complex browser plugins installed therein. With WebRTC capability built in a web browser, a web based application can instruct the web browser to make a real time voice or video connection to another WebRTC capable UE using an RTP session.

FIGS. 1A and 1B illustrate conventional real-time communication systems.

As illustrated in FIG. 1A, in WebRTC, a shared RTP session transmitted over a shared in-band data channel is utilized to exchange a plurality of different types of media packets (e.g., audio packets and video packets) over a media instance between UEs on a shared User Datagram Protocol (UDP) port. A receiver may need to differentiate between the plurality of media packets to provide different ones of the plurality of media packets to different processing engines.

As further illustrated in FIG. 1A, to differentiate between the plurality of media packets, the receiver may receive, over an out-of-band signaling channel, information on the media instance associated with a Synchronization Source (SSRC) that identifies an associated media instance (e.g. a SSRC-to-media instance binding) such that upon receiving a data packet, over the data channel, containing the SSRC, the receiver can determine which processing engine should process the media instance. For example, the receiver may utilize the SSRC-to-media instance binding to determine that a specific SSRC is associated with a type of audio engine.

Further, to synchronize different associated media instances with each other, the receiver may need to have knowledge of canonical names (CNAMEs) that uniquely identifies the UEs across the different media instances (e.g. a SSRC-to-CNAME binding). For example, the SSRC-to-CNAME binding may bind an audio instance with an associated video instance to synchronize a multimedia session.

To establish the SSRC and CNAME, the UE wishing to transmit the media instance (e.g., the source) may advertise the SSRC-to-media instance binding and the SSRC-to-CNAME binding using an out-of-band method, for example, over Session Description Protocol (SDP) messages on a discrete signaling channel.

However, as illustrated in FIG. 1B, in a communication session between UEs where one of the UEs is not WebRTC compliant, the non-compliant UE may be unable to support the exchange of the binding information, namely the transmission over the signaling channel of the SSRC-to-media instance binding and the SSRC-to-CNAME binding.

Further, even if both UEs are WebRTC compliant, intermediate devices within the IMS network may not be WebRTC compliant and may thus the SSRC and CNAME information may be lost in transmission.

SUMMARY

Example embodiments described herein relate to a translation device, a communication method and/or a system configured to translate media packets.

At least one example embodiment relates to a translation device.

In one embodiment, the translation device includes a receiver configured to receive packets from a first party designated for a second party, the received packets including parameters associated with the first party; a processor configured to translate the parameters of the received packets to form translated packets such that the parameters of the translated packets are associated with the translation device; and a transmitter configured to transmit the translated packets to the second party.

In one embodiment, the parameters associated with the first party include a canonical name (CNAME) associated with the first party, a Synchronization Source (SSRC) associated with an application instance transmitted by the first party and a sequence number associated with the received packets.

In one embodiment, the processor is configured to generate the translated packet by, substituting the CNAME associated with the first party with the CNAME associated with the translation device, substituting the SSRC associated with the application instance with an SSRC associated with a new application instance, and substituting the sequence number associated with the received packets with a sequence number associated with the translated packets.

In one embodiment, the transmitter is configured to transmit binding information to the second party over an out-of-band signaling channel, the binding information including an SSRC-to-application instance binding and an SSRC-to-CNAME binding, the SSRC-to-application instance binding indicating the application instance associated with the SSRC and the SSRC-to-CNAME binding indicating the device associated with the SSRC.

In one embodiment, the received packets are one or more of Real Time Protocol (RTP) packets and Real Time Control Protocol (RTCP) packets.

In one embodiment, the translation device is configured to perform the translation at an internet protocol multimedia subsystem (IMS) access border between the first party and the second party.

In one embodiment, the second party is a user equipment that is web real-time communication (WebRTC) compliant.

At least one example embodiment relates to a communications method.

In one embodiment, the communications method includes receiving, at a device, packets from a first party designated for a second party, the received packets including parameters associated with the first party; translating the parameters of the received packets to form translated packets such that the parameters of the translated packets are associated with the device; and transmitting the translated packets to the second party.

At least one example embodiment relates to a system configured to translate media packets.

In one embodiment, the system includes a first user equipment (UE) having a transmitter configured to send the media packets to a second UE over an IMS access network; and a translation device, located between the first UE and the second UE in the IMS access network, the translation device including, a receiver configured to receive the media packets from the first UE, a processor configured to translate parameters of the media packets to form translated packets such that the parameters of the translated packets are associated with the translation device, and a transmitter configured to transmit the translated packets to the second UE.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the embodiments and wherein:

FIG. 3 illustrates an example architecture for any one of a media receiver, a media sender and an RTP source translator according to an example embodiment;

FIG. 6 is a flow chart of an example of sending RTP and/or RTCP packets between a sender and a receiver utilizing a RTP source translator according to an example embodiment;

Figure 1A:
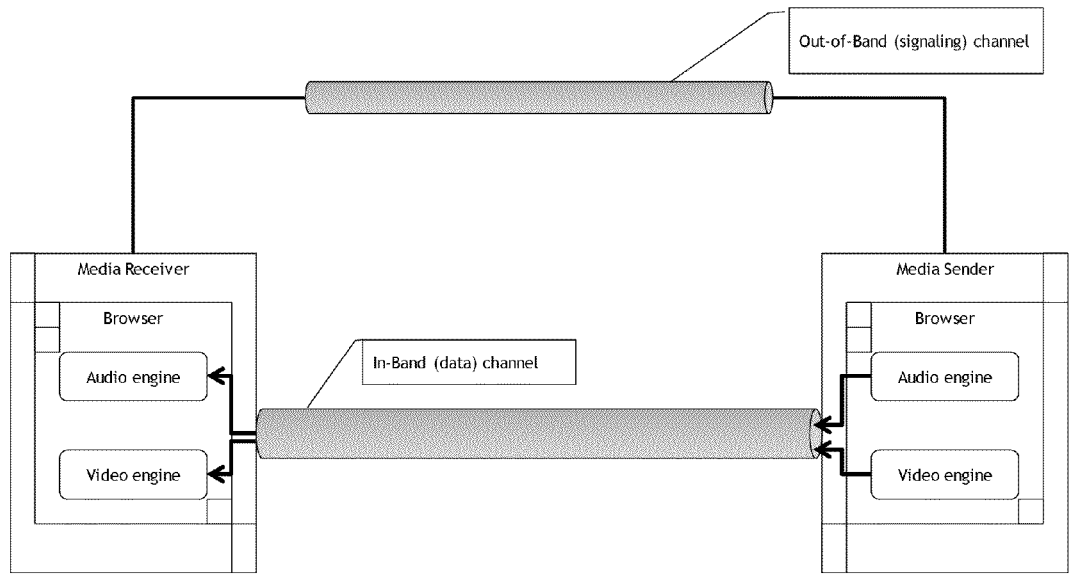
FIGS. 1A and 1B illustrate conventional real-time communication systems.
Figure 1B:
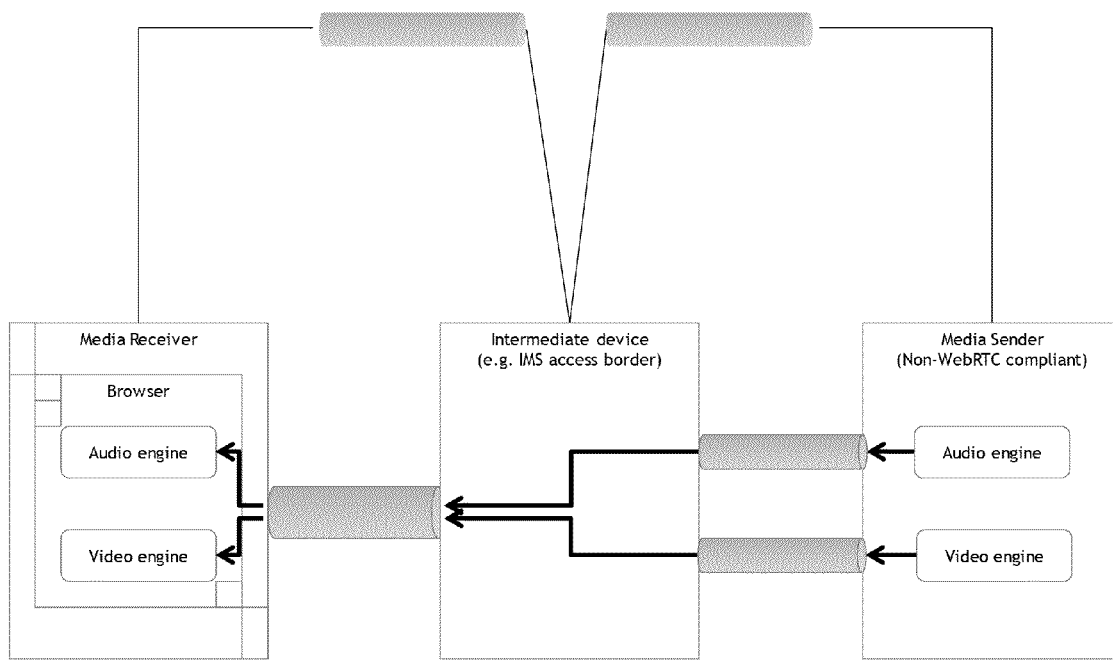

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 2 illustrates a block diagram of a Real-time transport Protocol (RTP) source translator system according to an example embodiment.

As shown in FIG. 2, the RTP source translator system includes a media sender 100, a media receiver 200 and an RTP source Translator 300.

The media sender 100 and the media receiver 200 may be user equipments (UE). The media sender 100 may utilize a real-time transport (RTP) protocol to deliver media packets to the media receiver 200.

The RTP session between the media sender 100 and the media receiver 200 utilizes two flows, a Real Time Protocol (RTP) flow which carries real-time data packets and a Real Time Control Protocol (RTCP) flow which carries information regarding the quality of service and conveys information about participants in the RTP session. The RTP and RTCP packets are encapsulated as the payload of User Datagram Protocol (UDP) packets.

A WebRTC compliant UE utilizes a single RTP session to convey multiplexed data of multiple media instances (e.g. audio instances and video instances) as the payload carried by an associated UDP packet. To establish the RTP session, a source description (SDES) RTCP packet may be transmitted that contains the SSRC of the media instance and an canonical name (CNAME), that is a persistent transport-level identifier that uniquely identifies an associated UE across the application instances, After transmission of the initial SDES RTCP packet, headers of transmitted RTP data packets may contain the SSRC that identifies the associated media instance, and a sequence number (SN) that is used by the media receiver 200 to detect packet loss and to process the received packets in the same sequence as they are generated.

To properly process received RTP packets, the media receiver 200 may utilize an associated SSRC-to-media instance binding to determine which media instance is associated with the SSRC of the received RTP packets. While the SSRC-to-media instance binding may be used to determine which media instance is associated with the SSRC, the SSRC identifier may change. For example, the SSRC identifier may change if a conflict is discovered or an application is restarted. Further, multiple data streams associated with each other will have different SSRC identifiers, even if they originate from the same UE, irrespective of whether the data streams are related. Therefore, the media receiver 200 may also utilize an associated SSRC-to-CNAME binding to determine the UE associated with an SSRC.

The RTP translator 300 is configured to provide one-way translation between the media sender 100 and the media receiver 200 by removing the sender's 100 parameters and substituting parameters of the translator 300 before forwarding the RTP packet to the media receiver 200. The RTP source translator 300 may be located at an access border within the IMS network.

Figure 2A:
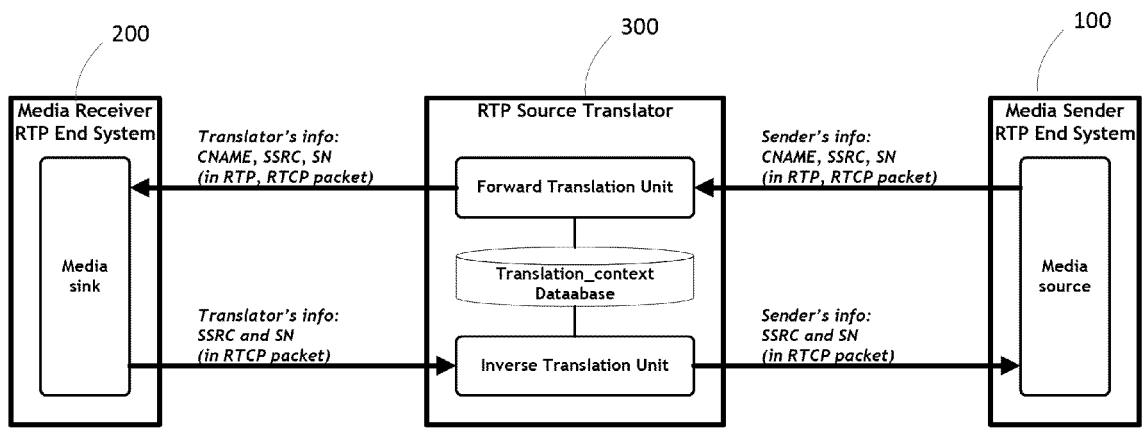
FIGS. 2A and 2B are blocks diagrams of an RTP source translator according to an example embodiment.

As illustrated in FIG. 2A, the RTP translator 300 includes a forwarding translation unit and an inverse translation unit. The forward translation unit is configured to translate media packets having the media sender's 100 parameters (e.g., CNAME, SSRC, SN) with parameters (e.g., CNAME, SSRC and SN) associated with the RTP translator 300. The inverse translation unit is configured to inverse translate feedback packets from the media receiver 200 to the media sender 100 such that the translation is transparent to the media sender 100.

Figure 2B:
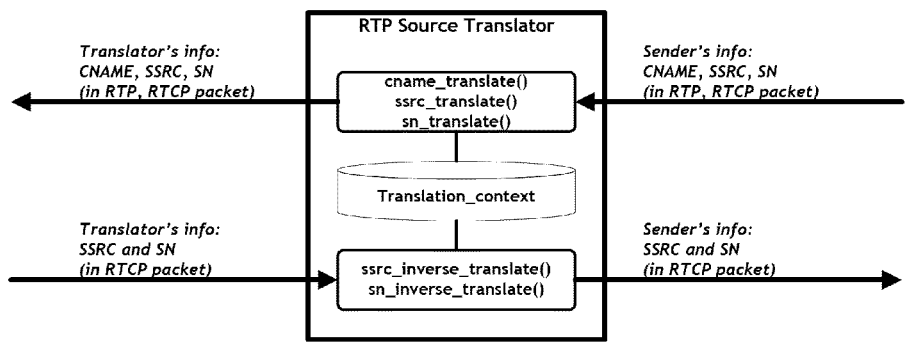

More specifically, as illustrated in FIG. 2B, the forward translation unit includes a cname translation function (cname_translate) to replace a CNAME associated with the media sender 100 with a CNAME associated with the RTP translator 300, an ssrc translation (ssrc_translate) function to replace an SSRC associated with a media instance of the sender 100 with an SSRC associated with the RTP translator 300, and a sequence number translation (sn_translate) function to replace a sequence number associated with the sender 100 with a sequence number associated with the RTP translator 300.

The inverse translation unit includes a ssrc inverse translation function (ssrc_inverse_translate) to replace a SSRC associated with the media instance of the translator 300 with the SSRC associated with the media instance of the sender 100 and an inverse sequence number translation (sn_inverse) function to replace a sequence number associated with the RTP translator 300 with a sequence number associated with the sender 100.

Detailed examples of the translation functions performed by the forward translation unit and inverse translation unit will be discussed with reference to the flow charts of FIGS. 6 to 8.

As a result, while both the media sender 100 and the media receiver 200 are communicating through the intermediary RTP source translator 300, from the point-of-view of the media sender 100, it appears that the media sender 100 is communicating directly with the media receiver 200. Further, from the point-of-view of the receiver 200, the translator 300 is the originator of the RTP packets and because the receiver 200 knows the SSRC of the translator 300, the receiver 200 can use this SSRC to de-multiplex the received RTP packets so that the packets can be decoded with the correct codec.

FIG. 3 illustrates an example architecture for any one of a media receiver, a media sender and an RTP source translator according to an example embodiment.

Referring to FIG. 3, each of the media sender 100, receiver 200 and RTP source translator 300 may include, for example, a transmitting unit 210, a receiving unit 220, a memory unit 230, a processing unit 240, and a data bus 250.

The transmitting unit 210, receiving unit 220, memory unit 230, and processing unit 240 may send data to and/or receive data from one another using the data bus 250.

The transmitting unit 210 is a device that includes hardware and any necessary software for transmitting signals including, for example, data signals and control signals to other network elements.

The receiving unit 220 is a device that includes hardware and any necessary software for receiving wireless signals including, for example, data signals and control signals to other network elements.

The memory unit 230 may be any device capable of storing data including magnetic storage, flash storage, etc. The memory unit 230 may store information regarding the translation of data packets, as required by the example embodiments.

The processing unit 240 may be any device capable of processing data including, for example, a microprocessor configured to carry out specific operations based on input data, or capable of executing instructions included in computer readable code. The computer readable code may be stored on, for example, the memory unit 230. Accordingly, the media sender 100 and media receiver 200 have processing units 240 capable of executing code to generate, transmit and receive data packets and the translator 300 has a processing unit 240 capable of executing code to translate and forward data packets.

Figure 4A:
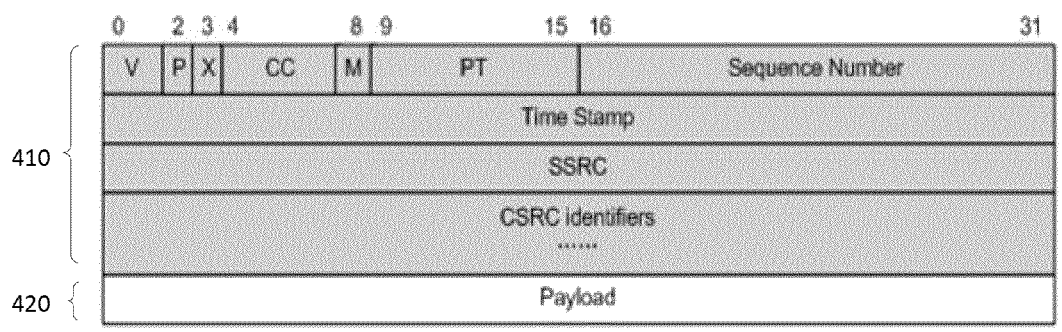
FIGS. 4A and 4B are examples of an RTP packet and a UDP packet encapsulating the RTP packet therein, respectively, according to an example embodiment.
Figure 4B:
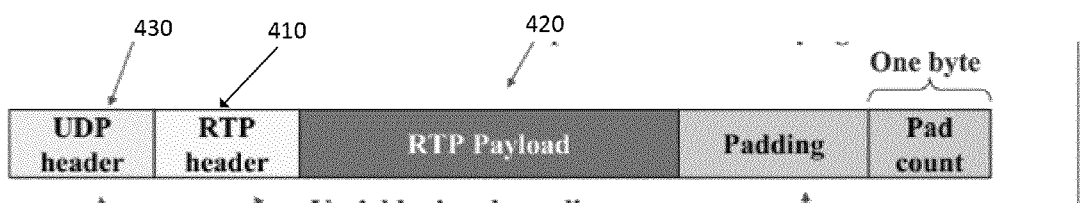

FIGS. 4A and 4B are examples of an RTP packet and a UDP packet encapsulating the RTP packet therein, respectively, according to an example embodiment.

As illustrated in FIG. 4A, an RTP packet may include a header 410 and a payload 420. The header 410 may include a version (V) field, a padding (P) field, an extension (X) field, a CSRC count (CC) field, a marker (M), a payload type (PT), a sequence number (SN), a time stamp, a SSRC, and a CSRC field.

The version (V) field may be 2 bits and identifies the version of RTP. The padding (P) bit may be 1 bit such that if the padding bit is set, the packet contains one or more additional padding octets at the end which are not part of the payload. If the Extension (X) bit is set, the fixed header may be followed by a header extension. The CSRC count (CC) may be 4 bits and contain the number of CSRC identifiers that follow the fixed header. The payload type (PT) may identify the format (e.g. encoding) of the RTP payload.

The sequence number (SN) may be 16 bits and may increment by one for each RTP data packet sent, and may be used by the receiver to detect packet loss and to restore packet sequence. The initial value of the sequence number may be random (unpredictable) for encryption purposes.

The SSRC field may be 32 bits and may identify the synchronization source. This identifier may be chosen randomly, with the intent that no two synchronization sources within the same RTP session will have the same SSRC identifier.

As illustrated in FIG. 4B, the RTP header 410 and associated payload 420 may be encapsulated within a User Datagram Protocol (UDP) packet. The UDP packet may include a UDP header 430 as well as the RTP header 410 and RTP payload 420 encapsulated as the UDP payload.

Figure 5A:
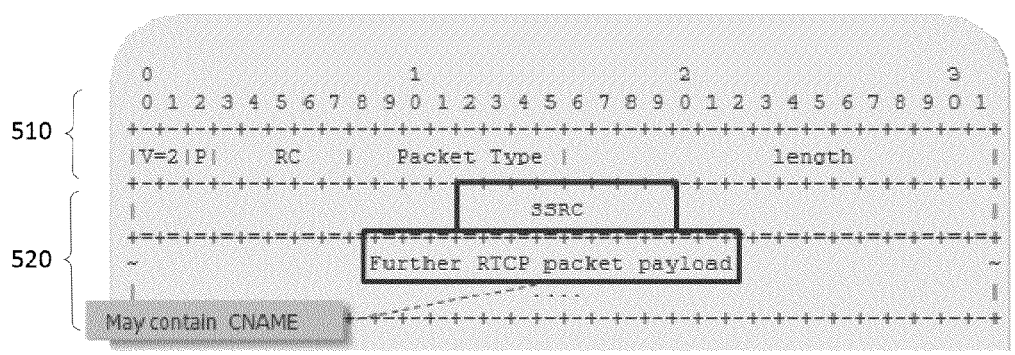
FIGS. 5A and 5B are examples of an RTCP packet and a UDP packet encapsulating the RTCP packet therein, respectively, according to an example embodiment.
Figure 5B:
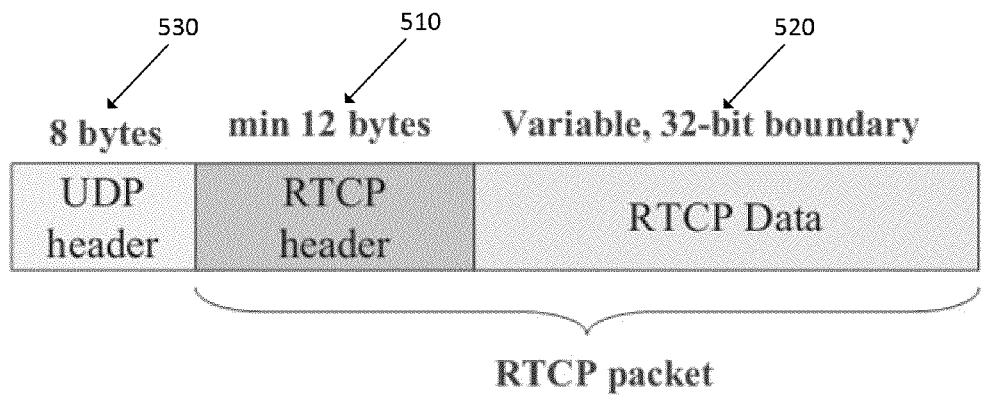

FIGS. 5A and 5B are examples of an RTCP packet and a UDP packet encapsulating the RTCP packet therein, respectively, according to an example embodiment.

As illustrated in FIG. 5A, the RTCP packet includes an RTCP header 510 and an associated payload 520. The RTCP header 510 may include a version (V) field, a padding (P) field, a RC field, a packet type (PT) field, and a length field. The associated payload 520 may include a SSRC and an additional field which may carry a persistent transport-level identifier for the associated media sender 100 (e.g., the canonical name or CNAME).

As illustrated in FIG. 5B, the RTCP header 510 and associated payload 520 may be encapsulated within a UDP packet. The UDP packet may include a UDP header 530 and the RTCP header 510 and RTCP payload 520 encapsulated as the UDP payload.

FIG. 6 is a flow chart of an example of sending RTP and/or RTCP packets between a sender and a receiver utilizing a RTP source translator according to an example embodiment.

In operation S600, the processing unit 240 of the sender 100 may generate a source description (SDES) RTCP packet that includes the SSRC of the media instance together with the CNAME associated with the UE and instruct the transmitting unit 210 of the sender 100 to send the RTCP SDES packet to the media receiver 200. The sent RTCP packets may have the structure of the RTCP packet illustrated in FIG. 5 After sending the RTCP SDES packet, the media sender 100 may begin to generate and send RTP data packets associated with a media instance. To generate the RTP packets, the processing unit 240 of the sender 100 determines a next sequence number SN and a SSRC associated with the media instance and instructs the transmitting unit 210 of the sender 100 to send the RTP packet to the media receiver 200 through the translator 300. The sent RTP packets may have the next SN and the SSRC in the packet header, as illustrated in FIG. 4.

In operation S610, the processing unit 240 of the RTP source translator 300 may perform forward translation on the CNAME, SSRC and SN of the received RTCP and RTP packets. More specifically, the processing unit 240 of the RTP source translator 300 performs forward translation on the received RTCP packet to translate the SSRC and the CNAME contained therein. Further, the processing unit 240 of the RTP source translator 300 also performs forward translation on the RTP packets to translate the sequence number SN and the SSRC contained therein. Operation S610 will be described in more detail below with reference to FIG. 7.

In step S620, the RTP source translator 300 may send, using the transmitting unit 210, binding information for the translated packet to the media receiver 200 over an out-of-band signaling channel. Further, the RTP source translator 300 may send the translated RTP packet to the media receiver 200 over an in-band data channel.

In step S630, the processing unit 240 of the receiver 200 determines the correct processing engine to process the translated packet based on an ssrc-to-application instance binding within the received out-of-band binding information. Further, the processing unit 240 of the receiver 200 may synchronize different received packets utilizing an SSRC-to-CNAME binding within the received out-of-band binding information.

In step S640, the processing unit 240 of the receiver 200 may instruct the transmitting unit 210 of the receiver 200 to transmit feedback information to the sender 100 in an RTCP packet.

In step S650, the processing unit 240 of the of the RTP source translator 300 performs inverse translation on the RTCP packet received from the receiver 200. The RTP source translator 300 sends, using the transmitting unit 210, the inverse translated RTCP packet to the media sender 100. Step S650 will be described in more detail below with reference to FIG. 8.

Figure 7A:
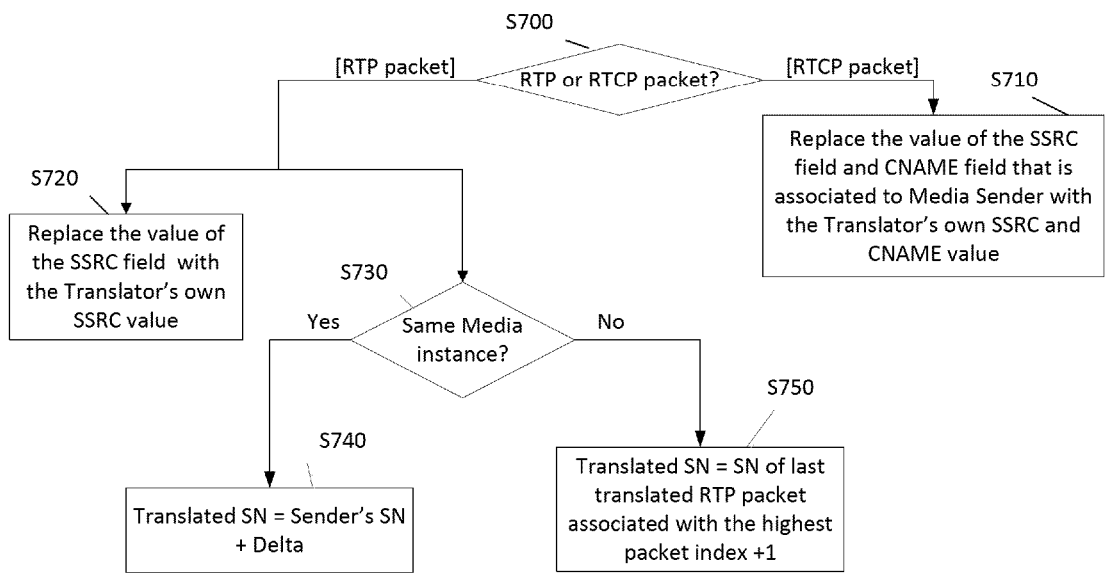
FIGS. 7A and 7B are flow charts of an example of performing forward translation on the RTP and/or RTCP packets according to an example embodiment.
Figure 7B:
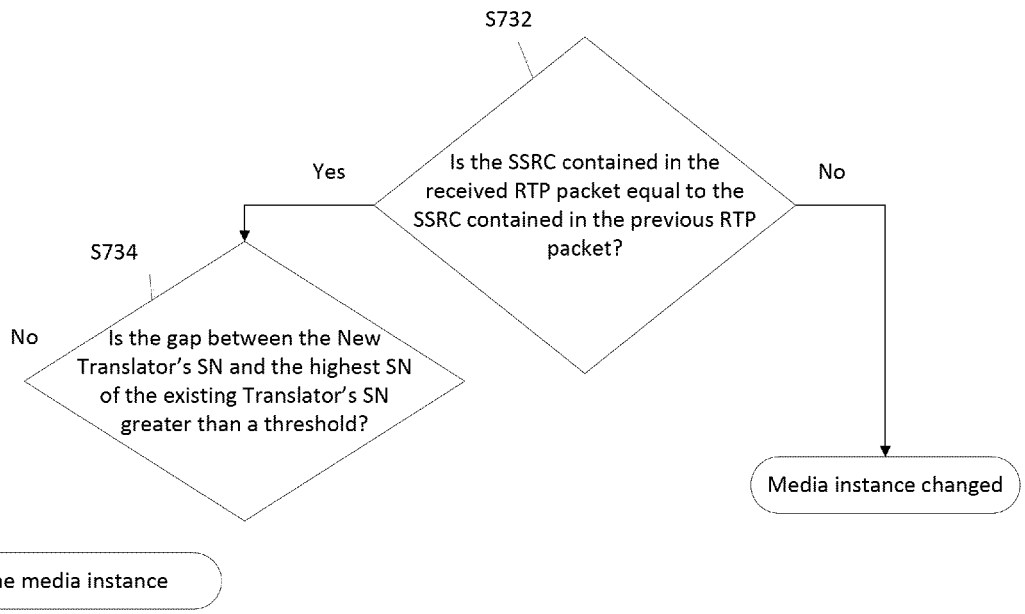

FIGS. 7A and 7B are flow charts of an example of performing forward translation on the RTP and/or RTCP packets according to an example embodiment.

As illustrated in FIG. 7A, in operation S700, the processing unit 240 of the RTP source translator 300 may determine whether a received packet is an RTP packet or a RTCP by checking the packet header. The RTP packet header may have a structure as illustrated in FIG. 4A while the RTCP packet header may have a structure as illustrated in FIG. 5A.

If in operation S700, the processing unit 240 of the RTP source translator 300 determines that the received packet is an RTCP packet, then the processing unit 240 may determine that the SSRC and the CNAME may need to be translated.

More specifically, if in operation S700, the processing unit 240 determines that the received packet is the RTCP packet, then in operation S710, the processing unit 240 of the RTP source translator 300 may replace a value in the SSRC field of the received RTCP packet, that is currently associated to the media sender 100, with an SSRC associated with the RTP source translator 300. Further, the processing unit 240 of the RTP source translator 300 may replace a value in the CNAME field of the received RTCP packet with CNAME information associated with the translator 300.

If in operation S700, the processing unit 240 determines that the received packet is an RTP packet, then the processing unit 240 may determine that the Sequence Number (SN) and the SSRC may need to be translated.

More specifically, if in operation S700, the processing unit 240 determines that the received packet is the RTP packet, then in operation 720, the processing unit 240 may replace the SSRC value in the received RTP packet with the SSRC associated with the RTP source translator 300.

Further, if in operation S700 the processing unit 240 determines that the received packet is the RTP packet, then in operation S730, the processing unit 240 may translate the sequence number by first determining if the media instance, as indicated by the SSRC and the Sequence Number (SN) within the received RTP packet, has changed. Details of the determination of whether the media instance has changed will be described in detail with reference to FIG. 7B.

Referring to FIG. 7B, in step S732, to determine if the media instance has changed, the processing unit 240 may first check whether the SSRC value in the received RTP packet is equal to the SSRC value contained in the previous RTP packet. The SSRC of the previous RTP packet may be stored, for example, in a translation context database within the memory unit 270 of the RTP source translator 300, as illustrated in FIGS. 2A and 2B.

If the processing unit 240 determines that the SSRC value is not equal to the SSRC value of the previous packet, the processing unit 240 may determine that the media instance has changed and translate the SN according to operation S750.

If the processing unit 240 determines that the SSRC value is the same, in operation S734, the processing unit 240 may further analyze if the media instance has changed by analyzing any "gap" that exists between the SN of the translated RTP packet and the highest utilized sequence number (SN) of the translated RTP packets for the current media instance to differentiate between a gap in sequence numbers (SNs) due to packet loss and a gap in SNs due to a changed media instance source.

To analyze the gap, the processing unit 240 may determine if the difference between the translated SN and the highest utilized SN by the translator 300 for the current media instance is less than or equal to a threshold. The highest SN of the translated packets for the current media instance may be stored, for example, in the translation context database. Further, the threshold may be set by an operator and stored, for example, in the translation context database.

If in operation 734, the processing unit 240 determines that the gap between the sequence numbers SN is within the threshold, then the processing unit 240 may conclude that the currently received RTP packet is part of the same media instance as the last translated RTP packet and proceed to operation S740. In contrast, if the processing unit 240 determines that the gap between the sequence numbers SN is greater than the threshold, then the processing unit 240 may conclude that the currently received RTP packet is part of a different media instance as the last translated RTP packet and translate the SN according to operation S750.

If, in operation 730, the processing unit 240 determines that the received RTP packet is from the same media instance, then in operation S740, the processing unit 240 may derive the SN assigned to the RTP packet being translated by adding an offset delta Δ to the SN of the received RTP packet.

The processing unit 240 may store the newly generated SN as the highest sequence number (SN) in, for example, in the translation context database. Further, the processing unit 240 may store the newly assigned SN as an initial SN utilized to translate the current media instance. This stored initial SN may be utilized to perform inverse translation, as discussed in detail below.

The offset Δ may be any offset utilized to separate the received RTP/RTCP packets from the translated RTP/RTCP packets. For example, the offset Δ may have a value equal to the difference between the highest sequence number (SN) utilized by the translator 300 in the translated packets of the current media instance and the sequence number (SN) associated with the received RTP/RTCP packet.

For example, if the highest sequence number inserted into the header of the translated RTP/RTCP packets by the translator 300 is "0" and the current RTP/RTCP packet received at the translator 300 has a sequence number of "10" then the offset Δ may be equal to 0-10=−10. Therefore, the processing unit 240 may derive the SN assigned to the RTP packet by adding the offset of "−10" to the SN of the received RTP packet "10", such that the translated RTP/RTCP packet has a sequence number of "0".

The processing unit 240 may continue to translate incoming received RTP/RTCP packets by continually advancing and storing the highest sequence number (SN) and adding the same offset thereto until, in operation S730, the processing unit 240 detects a change in the media instance of the received RTP/RTCP packet. Further, as illustrated in FIG. 4A, the sequence number may be represented by 16 bits, therefore, as the sequence numbers assigned are continually advanced, the sequence number may be restarted when 2^16 RTP packets have been generated.

If, in operation S730, the processing unit 240 determines that the received RTP packet is from a different media instance, then in operation S750, the processing unit 240 may advance the index of the highest sequence number (SN), stored at the translator 300 and utilize the advanced index of the highest sequence number (SN) to assign a sequence number (SN) to the RTP packet being translated. The processing unit 240 may store, in the translation context database, the newly assigned SN as an initial SN utilized to translate the current media instance. This stored initial SN may be utilized to perform inverse translation, as discussed in detail below.

The index of the highest sequence number (SN), may be advanced by any number to separate the index associated with the new media instance from the index associated with the previous media instance. For example, the index of the highest sequence number (SN), may be incremented by "1".

For example, if index of the highest sequence number (SN) currently is at "2" and a received RTP packet is determined to be from a different media instance, then the translated RTP packet may be given a sequence number of "3". Further, the index of the highest sequence number (SN) may be incremented to store the value "3" therein.

Figure 8A:
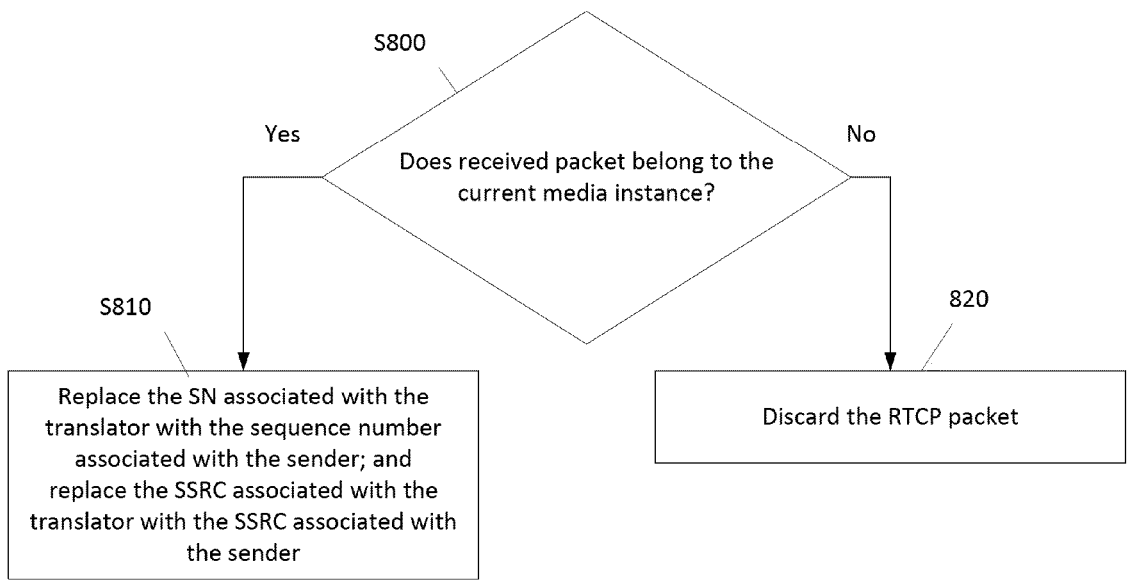
FIGS. 8A and 8B are flow charts of an example of performing inverse translation on the RTCP packets according to an example embodiment.
Figure 8B:
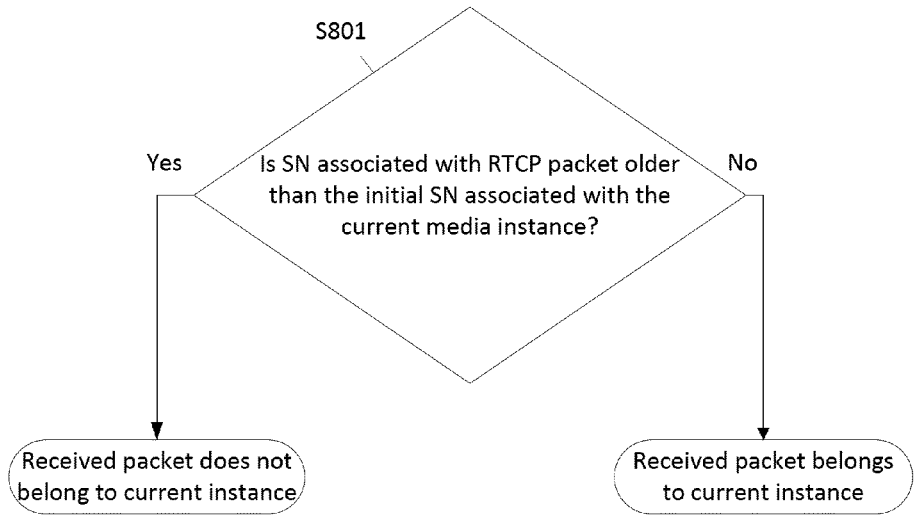

FIGS. 8A and 8B are flow charts of an example of inverse translation of the RTCP packets according to an example embodiment.

As illustrated in FIG. 8A, in operation S800, the processing unit 240 of the RTP source translator 300 may determine whether a feedback RTCP packet received from the media receiver 200 belongs to the current media instance. Details of the determination of whether the feedback RTCP packet belongs to the current media instance will be described in detail with reference to FIG. 8B.

Referring to FIG. 8B, in operation S801, processing unit 240 may retrieve, from its associated memory unit 230, the initial sequence number (SN) associated with the first translated RTP packet of the current media instance and determine whether the SN associated with the feedback RTCP packet is older than the initial SN associated with the current media instance.

If the SN associated with the feedback RTCP packet is older than the initial SN associated with the current media instance then the processing unit 240 may determine that the feedback packet does not belong to the current media instance and proceed to operation 820 where the processing unit 240 discards the incoming feedback RTCP packet without forwarding the feedback packet to the media sender 100.

If the SN associated with the feedback RTCP packet is not older than the initial SN associated with the current media instance or there is no SN included in the RTCP packet, then the processing unit 240 may determine that the feedback packet does belong the current media instance and proceed to operation 810.

In operation 810, the processing unit 240 may inversely translate the SN of the feedback RTCP packet by subtracting the offset delta Δ from the SN within the feedback RTCP packet and replacing the SSRC associated with the RTP source translator 300 with the SSRC associated with the media sender 100. As discussed above in operation S650, the inversely translated RTCP packet may be forwarded back to the media sender 100 such that from the perspective of the media sender 100 the translation is transparent.

For example, if the SN associated with the feedback RTCP packet is "4" and the offset Δ is "−47" then the feedback RTCP packet may be inversely translated to have a SN of 51 and forwarded to the media sender 100.

Figure 9:
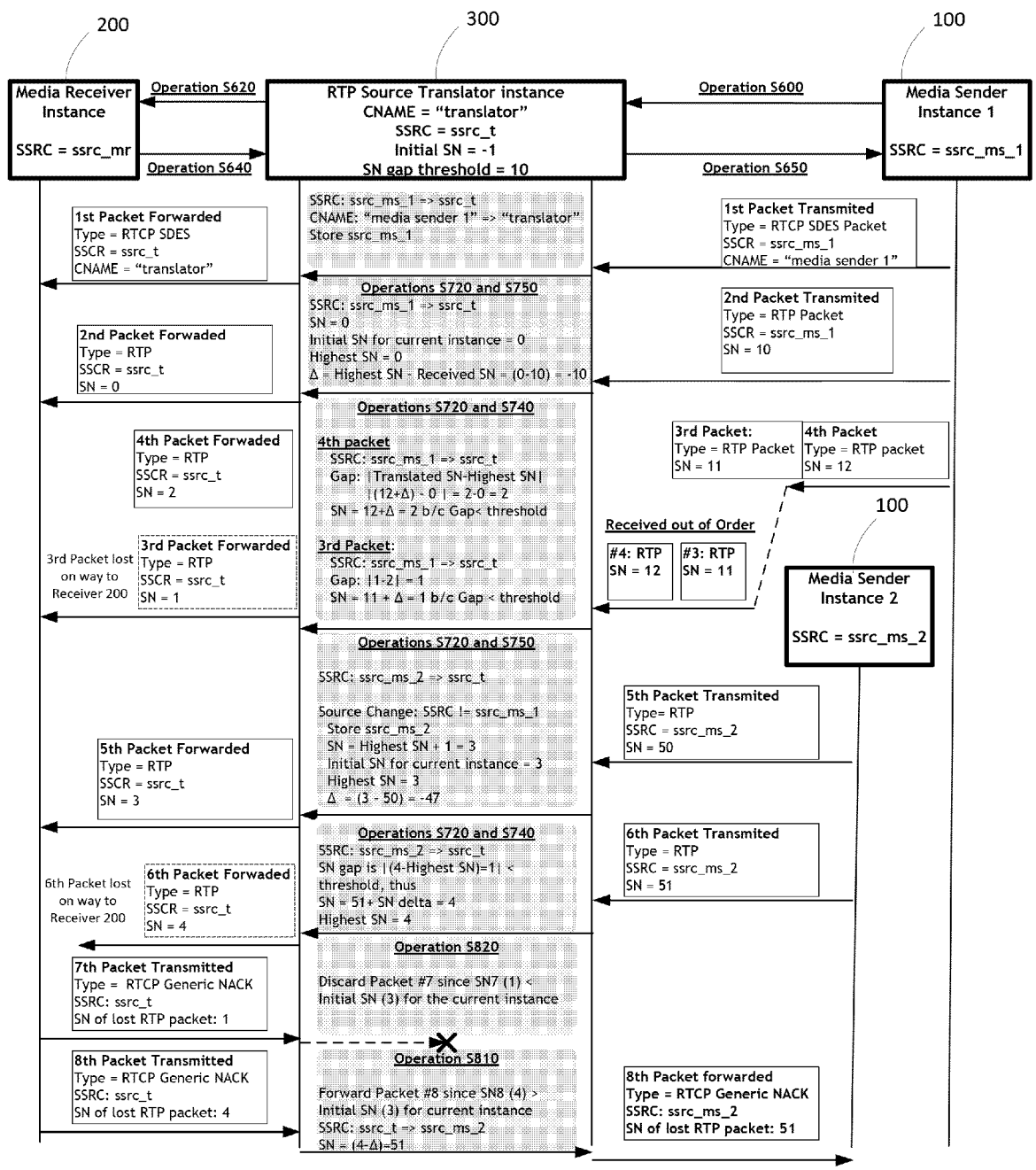
FIG. 9 illustrates a signaling diagram of sending RTP and/or RTCP packets between a sender and a receiver utilizing a RTP source translator according to example embodiments.

FIG. 9 illustrates a signaling diagram of sending RTP and/or RTCP packets between a sender and a receiver utilizing a RTP source translator according to example embodiments.

As illustrated in FIG. 9, in operation S600 of FIG. 6, a sender 100 may send various RTCP and RTP packets to the receiver 200 via a source translator. The SSRC of a media instance of the sender 100 may be "ssrc_ms_1", the SSRC of the translator 300 may be "ssrc_t" and the SSRC of the receiver 200 may be "ssrc_mr". The persistent CNAME associated with the sender 100 may be "sender" and the CNAME associated with the translator 300 may be "translator". The CNAME associated with the receiver 100 is not relevant to the example signaling diagram. The sequence number gap threshold set by an operator of the translator 300 may be ten (10) sequence numbers.

The various packets sent by the sender 100 in operation S600 of FIG. 6, may include a first packet "1st Packet" which may be a RTCP SDES packet. The RTCP SDES packet may include the SSRC and CNAME of the media sender.

Based on the received 1st packet, the translator 300 may store the SSRC associated with the media instance of the media sender 100 and CNAME associated with the media sender 100. Further, in operation S610, and more specifically in sub-operation S710 of operation S610 the translator 300 may determine that the received packets are RTCP packets and, therefore, may translate the first packet by replacing the SSRC and the CNAME with the SSRC and CNAME associated with the translator 300. In operation S620, the translator 300 may forward the translated first packet to the receiver 200.

Thereafter, in later operations S600, the sender 100 may transmit various RTP data packets to the receiver 200 via the RTP source translator 300.

In further S600 operations, The various RTP data packets may include a second packet "2nd packet" which may be a RTP packet that includes the SSRC of the media instance of the sender 100 and a sequence number of "10". In operation S610, and more specifically in sub-operations S720 and S740 of operation S610, the translator 300 may determine that the received packets are RTP packets and, therefore, may translate the second packet by replacing the SSRC with the SSRC associated with the translator 300. Further, in sub-operation S730, translator 300 may determine that the second packet is the first data packet associated with media instance "ssrc_ms_1". Therefore, in sub-operation s740, the translator 300 may translate the sequence number of the second packet by advancing an index of the highest sequence number (SN), stored at the translator 300 and assign the advanced index of the highest sequence number (SN) as the translated sequence number of the second packet. For example, if the index of the highest sequence number (SN) begins at −1, the translator 300 may assign a translated sequence number of "0" to the second packet and the translator 300 may record the initial sequence number "0" in the translation context database of the memory unit 230 as the current highest sequence number associated with media instance "ssrc_ms_1". Alternatively, there may be a separate sub-operation s760 (not-illustrated) utilized for the first data packet, where the translator 300 may translate an initial data packet using an initial sequence number, for example "0" and may record the initial sequence number "0" in the translation context database of the memory unit 230 as the current highest sequence number associated with media instance "ssrc_ms_1".

Further, the translator 300 may determine an offset Δ as the difference between the highest sequence number utilized to translate the current media instance, in this case "0", and the sequence number associated with the received second packet, in this case "10". Therefore, the translator 300 may determine that the offset Δ for the current media instance is "−10" and store the offset Δ in the translation context database. In operation S620, the translator 300 may forward the translated second packet to the receiver 200.

In still further S600 operations, a third packet "3rd packet", having a sequence number of "11", and a fourth packet "4th packet", having a sequence number of "12", are sent sequentially by the sender 100 to the receiver 200 via the translator 300, however, in operation S610, the third packet and the fourth packet arrive out of order at the translator 300.

In sub-operations S732 and S734, the translator 300 determines whether the fourth packet is part of the same media instance as the previously translated second packet. More specifically, in sub-operation S732, the translator 300 compares the SSRC of each of the received second and fourth packets, which both contain the SSRC "ssrc_ms_1". Further, in sub-operation S734, the translator 300 translates the sequence number by adding the offset Δ of "−10" to the sequence number "12" of the received fourth packet to generate a translated sequence number of "2". Because the translated sequence number of "2" is less than the gap threshold of "10", the translator 300 may determine that the fourth packet is part of the same media instance as the second packet. In sub-operation S740, the translator 300 may replace the sequence number of the fourth packet with the translated sequence number determined in operation S734. The translator 300 may update the index of the highest sequence number utilized for the current media instance "ssrc_ms_2" to reflect the highest assigned sequence number of "2". In operation S620, the translator 300 may forward the translated fourth packet to the receiver 200.

The third packet, may be processed by the translator 300 in the same way as the fourth packet is processed by the translator 300 such that the SSRC is replaced with the SSRC of "translator" and a sequence number of "1" is assigned to the third packet. However, in operation S620, the translated third packet is lost during transmission between the translator 300 and the receiver 200. As discussed below with reference to a seventh packet, the lost packet third packet may require the receiver 200 to generate a seventh packet, as a feedback packet to request retransmission of the third packet.

In still further S600 operations, a fifth packet "5th packet", belonging to a second media instance "ssrc_ms_2" and having a sequence number of "50" may be transmitted by the sender 100. The sequence number "50" of the fifth packet may be a part of a new separate sequence from the sequence numbers associated with the first media instance "ssrc_ms_1". In operation S610 to perform forward translation of the fifth packet, the translator 300 may determine that the media instance has changed in sub-operation S730. Because the media instance has changed, in sub-operation S750 the translator 300 may translate the sequence number of the fifth packet by advance the index of the highest sequence number (SN), stored at the translator 300 and assign the advanced index of the highest sequence number (SN) as the translated sequence number of the fifth packet. Therefore, since the highest sequence number assigned to the first media instance "ssrc_ms_1" was "2" for the fourth packet, the translated sequence number of the fifth packet may be "3". Further, the translator 300 may store, in the translation context database, the newly assigned SN as the initial SN utilized to translate the current media instance "ssrc_ms_2". This stored initial SN may be utilized to perform inverse translation, as discussed in detail below with reference to inverse translated packets seven and eight. Further, the translator 300 may determine a new offset Δ as the difference between the highest sequence number utilized to translate the current media instance, in this case "3", and the sequence number associated with the received second packet, in this case "50". Therefore, the translator 300 may determine that the offset Δ for the current media instance is "−47" and store the offset Δ in the translation context database.

In still further S600 operations, a sixth packet "6th packet" belonging to the second media instance "ssrc_ms_2". The sixth packet may be processed by the translator 300 in the same way that the third and fourth packet is processed by the translator 300 such that the SSRC is replaced with the SSRC of "translator" and a sequence number of "4" is assigned to the third packet. In operation S620, the translator 300 may forward the translated sixth packet to the receiver 200. However, in operation S620, the translated sixth packet is also lost during transmission between the translator 300 and the receiver 200. As discussed below with reference to an eighth packet, the lost sixth packet may require the receiver 200 to generate an eighth packet, as a feedback packet to request retransmission of the sixth packet.

In operation S640, the receiver 200 may generate a seventh packet which may be a RTCP negative acknowledgment "NACK" packet that includes the SSRC "ssrc_t" of the translator 300 and the sequence number "1" of the lost third packet. In operation S800, the translator 300 may determine whether the received feedback packet belongs to the current media instance "ssrc_ms_2". More specifically, in sub-operation S801, the translator 300 may determine whether the sequence number "1" associated with the feedback RTCP packet is older than the initial sequence number "3" associated with the current media instance ssrc_ms_2. In sub-operation S820, the processing unit 240 discard the seventh feedback packet without forwarding the seventh packet to the media sender 100 because the feedback packet, as indicated by the older sequence number, does not belong to the current media instance "ssrc_ms_2".

In further S640 operations, the receiver 200 may generate an eighth packet which may be a RTCP negative acknowledgment "NACK" packet that includes the SSRC "ssrc_t" of the translator 300 and the sequence number "4" of the lost sixth packet. In sub-operation S801, the translator 300 may determine that the SN of "4" associated with the feedback RTCP packet is not older than the initial SN of "3" associated with the current media instance "ssrc_ms_2". Because the eighth packet is part of the current media instance "ssrc_ms_2", in sub-operation S810, the translator 300 may perform inverse translation by replacing the SSRC in the feedback RTCP packet with the SSRC of the media sender 100. Further, the translator 300 may inverse translate the sequence number associated with the feedback packet back to a sequence number associated with the media sender 100 utilizing the offset Δ. More specifically, the translator 300 may subtract the offset Δ "−47" from the sequence number "4" of the feedback packet to generate a sequence number "51" associated with the originally transmitted sixth packet. In operation S650, the translator 300 may forward the inversely translated eighth packet to the sender 100 such that from the perspective of the sender 100 the translation is transparent.

While example embodiments have been particularly shown and described, it will be understood by one of ordinary skill in the art that variations in form and detail may be made therein without departing from the spirit and scope of the claims.

We claim:

1. A translation device comprising:
a receiver configured to receive packets from a first party designated for a second party, the received packets including parameters associated with the first party, the parameters associated with the first party including a canonical name (CNAME) associated with the first party, a Synchronization Source (SSRC) associated with an application instance transmitted by the first party and a sequence number associated with the received packets;
a processor configured to translate the parameters of the received packets to form translated packets such that the parameters of the translated packets are associated with the translation device by,
substituting the CNAME associated with the first party with a CNAME associated with the translation device,
substituting the SSRC associated with the application instance with an SSRC associated with a new application instance, and
substituting the sequence number associated with the received packets with a sequence number associated with the translated packet; and
a transmitter configured to transmit the translated packets to the second party.

2. The translation device of claim 1, wherein the transmitter is configured to transmit binding information to the second party over an out-of-band signaling channel, the binding information including an SSRC-to-application instance binding and an SSRC-to-CNAME binding, the SSRC-to-application instance binding indicating the application instance associated with the SSRC and the SSRC-to-CNAME binding indicating the translation device associated with the SSRC.

3. The translation device of claim 1, wherein the received packets are one or more of Real Time Protocol (RTP) packets and Real Time Control Protocol (RTCP) packets.

4. The translation device of claim 1, wherein the translation device is configured to perform the translation at an internet protocol multimedia subsystem (IMS) access border between the first party and the second party.

5. The translation device of claim 1, wherein the second party is a user equipment that is web real-time communication (WebRTC) compliant.

6. A communications method comprising:
receiving, at a device, packets from a first party designated for a second party, the received packets including parameters associated with the first party, the parameters associated with the first party including a canonical name (CNAME) associated with the first party, a Synchronization Source (SSRC) associated with an application instance transmitted by the first party and a sequence number associated with the received packets;
translating the parameters of the received packets to form translated packets such that the parameters of the translated packets are associated with the device, the translating including,
substituting the CNAME associated with the first party with a CNAME associated with the device,
substituting the SSRC associated with the application instance with an SSRC associated with a new application instance, and
substituting the sequence number associated with the received packets with a sequence number associated with the translated packets; and
transmitting the translated packets to the second party.

7. The method of claim 6, wherein the transmitting includes transmitting binding information to the second party over an out-of-band signaling channel, the binding information including an SSRC-to-application instance binding and an SSRC-to-CNAME binding, the SSRC-to-application instance binding indicating the application instance associated with the SSRC and the SSRC-to-CNAME binding indicating the device associated with the SSRC.

8. The method of claim 6, wherein the received packets are one or more of Real Time Protocol (RTP) packets and Real Time Control Protocol (RTCP) packets.

9. The method of claim 6, wherein the translating is performed at an internet protocol multimedia subsystem (IMS) access border between the first party and the second party.

10. The device of claim 1, wherein the second party is a piece of user equipment that is web real-time communication (WebRTC) compliant.

11. A system configured to translate media packets, the system comprising:
a first user equipment (UE) having a transmitter configured to send the media packets to a second UE over an IMS access network; and
a translation device, located between the first UE and the second UE in the IMS access network, the translation device including,
a receiver configured to receive the media packets from the first UE, the received packets including parameters associated with the first UE, the parameters associated with the first UE including a canonical name (CNAME) associated with the first UE, a Synchronization Source (SSRC) associated with an application instance transmitted by the first UE and a sequence number associated with the media packets,
a processor configured to translate the parameters of the media packets to form translated packets such that the parameters of the translated packets are associated with the translation device by,
substituting the CNAME associated with the first UE with a CNAME associated with the translation device,
substituting the SSRC associated with the application instance transmitted by the first UE with an SSRC associated with a new application instance, and
substituting the sequence number associated with the media packets with a sequence number associated with the translated packets, and
a transmitter configured to transmit the translated packets to the second UE.

12. The system of claim 11, wherein the translation device is configured to transmit binding information to the second UE over an out-of-band signaling channel, the binding information including an SSRC-to-application instance binding and an SSRC-to-CNAME binding, the SSRC-to-application instance binding indicating the application instance associated with the SSRC and the SSRC-to-CNAME binding indicating the device associated with the SSRC.

13. The system of claim 11, wherein the media packets are one or more of Real Time Protocol (RTP) packets and Real Time Control Protocol (RTCP) packets.

14. The system of claim 11, wherein the second UE is web real-time communication (WebRTC) compliant.

* * * * *